Sept. 23, 1958     C. W. HIGDON     2,852,881
ARTIFICIAL BAIT
Filed March 2, 1956     2 Sheets-Sheet 1
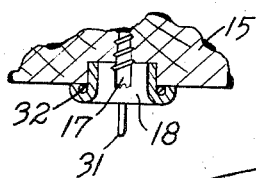
Fig. 4
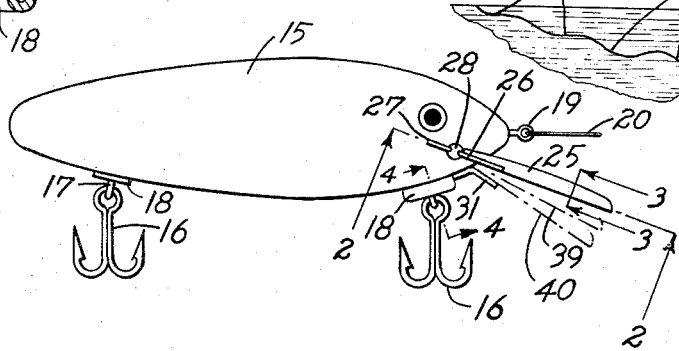
Fig. 1
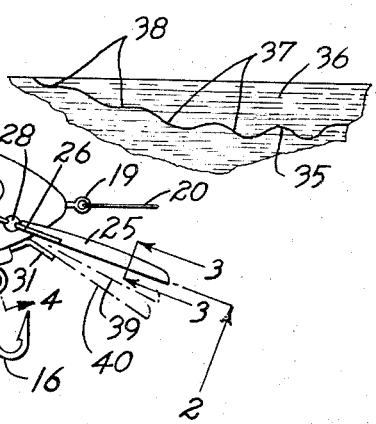
Fig. 5
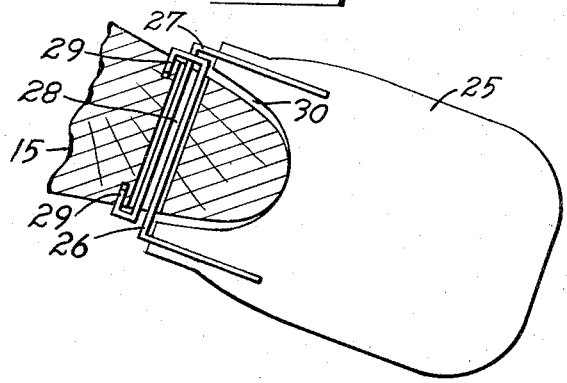
Fig. 2
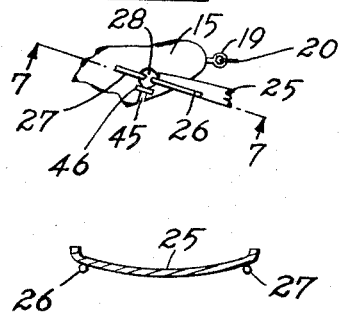
Fig. 6
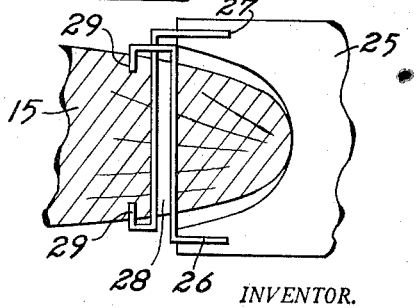
Fig. 7
Fig. 3
INVENTOR.
CHARLES W. HIGDON.
BY
DES JARDINS, ROBINSON & KEISER.
HIS ATTORNEYS.

Sept. 23, 1958  C. W. HIGDON  2,852,881
ARTIFICIAL BAIT
Filed March 2, 1956  2 Sheets-Sheet 2

INVENTOR.
CHARLES W. HIGDON.
BY
DES JARDINS, ROBINSON & KEISER.
Howard Keiser
HIS ATTORNEYS.

United States Patent Office 2,852,881
Patented Sept. 23, 1958

2,852,881
ARTIFICIAL BAIT
Charles W. Higdon, Fort Mitchell, Ky.

Application March 2, 1956, Serial No. 569,183

3 Claims. (Cl. 43—42.02)

This invention relates to a fish lure of the plug type in which an elongated wood or plastic body is made to simulate a minnow or small fish. The plug is fitted with one or more gang hooks which serve to snare the fish when it strikes at the bait. It is customary, in this type of artificial bait, to make the body of a material which is lighter than the water which it displaces so that the bait tends to float on the surface of the water when it is at rest. Normally, however, means is provided on the bait, for causing it to dive into the water when it is pulled therethrough by the fish line. The diving action of the bait in the water is customarily produced by providing a vane on the forward end of the body which is inclined at a suitable angle to cause the bait to descend in the water as it is pulled along by the fish line. However, as the bait descends, the upward pull of the line thereon tends to overcome the downward force exerted on the bait by the vane and the bait eventually reaches a level below which it will not descend. Also, in the case of a fixed vane, the bait moves with a steady, uniform downward motion and does not thereby operate in a manner serving to simulate the erratic, darting movement of a live bait in the water.

Accordingly, it is an object of the present invention to provide an artificial bait of the plug type which will descend into the water when pulled therethrough and which may be caused to move with a vacillating motion so as to simulate the movement of a small fish in the water.

Another object of the present invention is to provide a plug type of fish lure in which the angle of attack of the vane on the water is variable and may be increased or decreased in dependence on the pull exerted on the bait by the fish line.

Another object of the invention is to provide a plug type of artificial bait in which a vane is pivoted on the forward end of the bait by one or more torsion bars or wires which serve both as a pivot for the vane and also as biasing means therefor.

With these and other objects in view, which will become apparent from the following description, the invention includes certain novel features of construction and combinations of parts the essential elements of which are set forth in the appended claims and a preferred form or embodiment of which will hereinafter be described with reference to the drawings which accompany and form a part of this specification.

In the drawings:

Fig. 1 is a side elevation showing one embodiment of my improved form of artificial bait.

Fig. 2 is cross-sectional view taken along the line 2—2 in Fig. 1.

Fig. 3 is a cross-sectional view taken along the line 3—3 in Fig. 1.

Fig. 4 is a cross-sectional view taken along the line 4—4 in Fig. 1.

Fig. 5 is a schematic view illustrating the motion of the bait in the water.

Fig. 6 is a fragmentary side elevation showing a modification of the pivot hole for the vane.

Fig. 7 is a cross-sectional view taken along the line 7—7 in Fig. 6.

Figure 8:
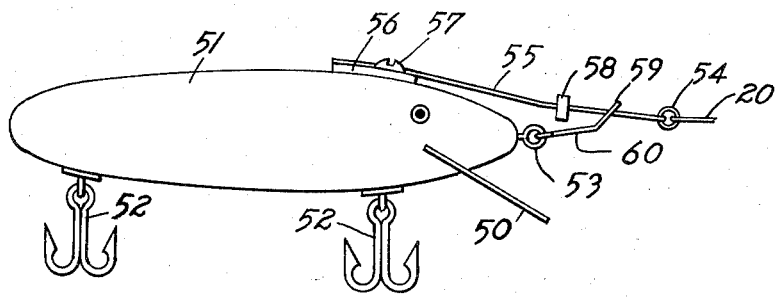
Figure 9:
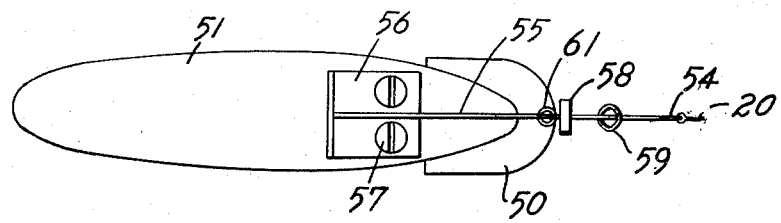
Figure 10:
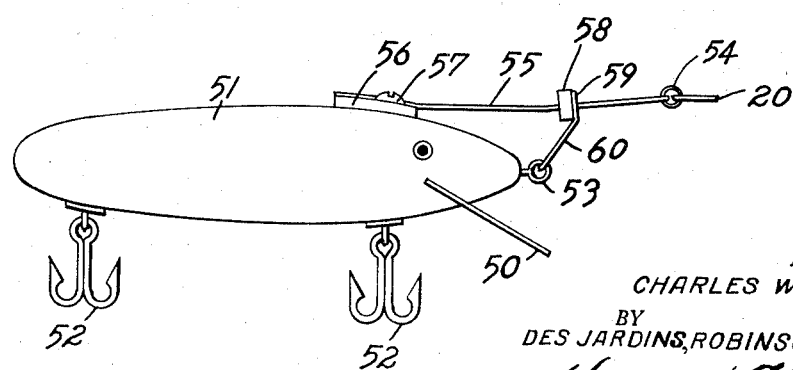

In Fig. 1 of the drawings, I have shown one possible form or embodiment of my invention. As therein shown, my improved form of artificial bait comprises a body 15, which may be made of wood or other suitable material and ornamented as desired, as by painting or lacquering the surface thereof, so as to render it attractive in appearance and prevent the wood from becoming water soaked. The body may be provided in the usual manner with one or more gang hooks 16 which may be attached to the body by screw-eyes 17 which pass through ferrules 18 (see Fig. 4) pressed into recesses in the body 15. The body is also provided at its forward end with a screw eye 19 which provides an attachment means for the fish line 20.

The bait is caused to dive into the water, when it is pulled therethrough, by a vane 25 which, as shown in Fig. 2, is generally flat in plan view and is mounted on the forward end of the body 15 so as to project forwardly and downwardly therefrom. The vane is arranged for pivotal movement on the body by means of a pair of torsion bars or wires 26 and 27 which pass through an aperture 28 which extends transversely through the forward end of the body. Each torsion wire 26 and 27 is secured at one end to the vane 25 and at the other end is provided with a bent-over end 29 which enters the body material and thereby anchors the wire in the body. The torsion wires are prestressed so as to urge the vane upwardly to the position shown in Figs. 1 and 2 where a cut-out 30 provided in the vane engages against the underside of the body and limits upward movement thereof. Movement of the vane in a downward direction, against the urgency of torsion wires 26 and 27, is limited by a stop element 31 which, as shown in Figs. 1 and 4, comprises a piece of wire having a loop 32 which lies under the rim of the ferrule 18 thereby holding the element 31, integral with the loop 32, in position to serve as a lower limit stop for the vane 25.

The operation of my improved form of artificial bait in the water is illustrated in Fig. 5 where the path of travel of the bait through the water is shown in side elevation. In this figure, the wavy line 35 represents the path of travel of the bait as it is drawn at varying speeds through the water 36. As the bait is drawn from left to right along the path 35, it may be caused to dive sharply, as represented by the portions 37 of the line 35, by increasing the pull on the fish line 20. Likewise, the bait may be caused to dive with a more gentle inclination with respect to the surface of the water, as indicated by the portions 38 of the line 35, by reducing the pull on the line 20. With a gentle pull on the line, the vane 25 will remain, under the influence of the torsion wires 26 and 27, in the position shown in Fig. 1. In this position of the vane, its angle of attack will be such as to cause the bait to execute a shallow dive. By increasing the pull on the line 20, the vane 25 will be deflected downwardly against the urgency of the torsion wires to the position indicated by the dot-dash line 39 in Fig. 1. Or, with a still greater pull on the line 20, the vane will be deflected to its lower limit of motion where it engages the stop element 31, this position being indicated by the dot-dash line 40 in Fig. 1. Due to the increased speed of travel of the bait through the water and the greater angle of attack of the vane with respect to the water, the bait will dive at a sharper angle, as indicated by the portions 37 of the line 35 (Fig. 5). Hence, by varying the pull on the line 20, the bait can be caused to follow a fluctuating path of travel through the water thereby simulating the movement of a live minnow.

In Figs. 6 and 7 is shown in modified form of construction of the bait body in the region of the pivot for the vane 25. In this form of the invention, a slot 45 is cut upwardly from the bottom of the body 15 into the lower side of the aperture 28 so as to provide an entry for the torsion wires 26 and 27 into the aperture 28 through the bottom of the body 15. By means of this feature, the wires 26 and 27 may be assembled on the vane 25 in the positions shown in Fig. 7 before the vane is placed on the bait. That is, the wires may be soldered or brazed to the vane 25 so as to lie in the positions shown in Fig. 7 while the vane is disassembled from the bait. The vane may thereafter be attached to the bait by passing the wires through the slot 45 and into the aperture 28 and then turning the vane to its normal, undeflected position as shown in Fig. 6. The ends 29 of the wires may then be forced into the material of the body 15 so as to anchor the wires thereto, the wires being prestressed in so doing. If desired, the slot 45 may thereafter be closed to prevent disengagement of the wires from the aperture 28 by any suitable means, such as by a bar or strip 46 as shown in Fig. 6. With this method of assembly, the manufacture of the baits may be facilitated and the wires 26 and 27 may be so spaced from one another as to engage snugly against opposite sides of the aperture 28 thereby providing a firm, steady pivot for the vane 25.

While I have described my invention in connection with several possible forms or embodiments thereof and have used, therefore, certain specific terms and language herein, it is to be understood that the present disclosure is illustrative rather than restrictive, and that changes and modifications may be resorted to without departing from the spirit of the invention or the scope of the claims which follow.

I claim:

1. An artificial bait comprising an elongated body, means on the forward end of said body for attaching a fishing line thereto, said body having a transverse aperture extending through its forward end and lying at a lower elevation in said body than said attaching means, a vane pivotally mounted on said body projecting forwardly and downwardly beneath said attaching means for controlling the action of the bait in the water, and a pair of torsion elements extending through said aperture, each of said elements being attached adjacent one end of said aperture to said vane and adjacent the opposite end of said aperture to said body, said elements serving to pivot said vane on said body and to bias said vane toward a normal, undeflected position.

2. The artificial bait of claim 1 including means in said body defining a transverse slot extending from said aperture to the bottom surface of said body for permitting entry of said elements into said aperture through said slot.

3. The artificial bait of claim 1 including abutment means on the bottom of said body for limiting pivotal movement of the vane on said body.

References Cited in the file of this patent

UNITED STATES PATENTS

| Number | Name | Date |
|---|---|---|
| 251,591 | Jaeger | Dec. 27, 1881 |
| 822,555 | Rogers | June 5, 1906 |
| 2,277,453 | Phillips | Mar. 24, 1942 |
| 2,437,523 | Hahn | Mar. 9, 1948 |
| 2,564,570 | Hatfield | Aug. 14, 1951 |
| 2,598,012 | Prieur | May 27, 1952 |
| 2,602,957 | Anderson | July 15, 1952 |
| 2,608,016 | Shipley | Aug. 26, 1952 |
| 2,663,963 | Russell | Dec. 29, 1953 |
| 2,753,648 | Paterno | July 10, 1956 |